US010360506B2

(12) United States Patent
O'Brien et al.

(10) Patent No.: US 10,360,506 B2
(45) Date of Patent: Jul. 23, 2019

(54) GENERAL FORMAL CONCEPT ANALYSIS (FCA) FRAMEWORK FOR CLASSIFICATION

(71) Applicant: HRL Laboratories, LLC, Malibu, CA (US)

(72) Inventors: Michael J. O'Brien, Culver City, CA (US); James Benvenuto, Beverly Hills, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 891 days.

(21) Appl. No.: 14/807,083

(22) Filed: Jul. 23, 2015

(65) Prior Publication Data

US 2017/0316318 A1    Nov. 2, 2017

Related U.S. Application Data

(63) Continuation-in-part of application No. 14/489,313, filed on Sep. 17, 2014, now Pat. No. 9,646,248.

(60) Provisional application No. 62/028,171, filed on Jul. 23, 2014.

(51) Int. Cl.
*G06N 5/04* (2006.01)
*G06N 20/00* (2019.01)
*G06N 5/02* (2006.01)

(52) U.S. Cl.
CPC .............. *G06N 5/04* (2013.01); *G06N 5/022* (2013.01); *G06N 20/00* (2019.01)

(58) Field of Classification Search
None
See application file for complete search history.

(56) References Cited

U.S. PATENT DOCUMENTS 6,865,567 B1    3/2005   Seigler et al.
8,204,623 B1 *  6/2012   Bhattacharyya ....... B25J 9/1666
                                                              700/1

(Continued)

FOREIGN PATENT DOCUMENTS

CN    101699444 A    4/2010
JP    2013-235398    11/2013

(Continued)

OTHER PUBLICATIONS

Notification Concerning Transmittal of International Preliminary Report on Patentability for PCT/US2015/041744; dated Feb. 2, 2017.

(Continued)

*Primary Examiner* — Paulinho E Smith
(74) *Attorney, Agent, or Firm* — Tope-McKay & Associates

(57) ABSTRACT

The system classifies data using formal concept analysis (FCA). In a training phase, the system generates a FCA classification lattice, having a structure, using a set of training data. The set of training data comprises training presentations and classifications corresponding to the training presentations. In a classification phase, a set of test data having classes that are hierarchical in nature is classified using the structure of the FCA classification lattice.

18 Claims, 8 Drawing Sheets
(1 of 8 Drawing Sheet(s) Filed in Color)

(56) References Cited

U.S. PATENT DOCUMENTS

| | | | | |
|---|---|---|---|---|
| 8,285,052 | B1* | 10/2012 | Bhattacharyya | G06F 17/30247 |
| | | | | 382/190 |
| 8,406,989 | B1* | 3/2013 | Bhattacharyya | B25J 9/1666 |
| | | | | 345/474 |
| 8,699,767 | B1* | 4/2014 | Khosla | G06K 9/00496 |
| | | | | 382/128 |
| 8,990,139 | B1* | 3/2015 | Howard | G06Q 10/101 |
| | | | | 706/46 |
| 9,002,762 | B1* | 4/2015 | Howard | G06N 3/02 |
| | | | | 706/20 |
| 2006/0112108 | A1 | 5/2006 | Eklund et al. | |
| 2006/0212470 | A1* | 9/2006 | Zhang | G06F 17/30734 |
| 2013/0238622 | A1* | 9/2013 | Tang | G06F 17/30864 |
| | | | | 707/737 |
| 2015/0100540 | A1 | 4/2015 | Sweeney et al. | |

FOREIGN PATENT DOCUMENTS

| | | | | |
|---|---|---|---|---|
| WO | 2010-147010 | | 12/2010 | |
| WO | 2013-144552 | | 10/2013 | |
| WO | WO-2013144552 | A1 * | 10/2013 | G06F 17/30958 |
| WO | WO-2016043846 | A3 * | 8/2016 | G06N 5/022 |

OTHER PUBLICATIONS

International Preliminary Report on Patentability for PCT/US2015/041744; dated Feb. 2, 2017.
Ganter, B. & Wille, R. (1998).Formal Concept Analysis: Mathematical Foundations. Springer-Verlag, Chapter 1, pp. 16-62.
Carpineto, C. & Romano, G. (2004). Concept Data Analysis: Theory and Applications. Wiley, Chapter 2, pp. 25-77.
Carpineto, C. & Romano, G. (2004). Concept Data Analysis: Theory and Applications. Wiley, Chapter 3, pp. 83-104.
Endres, D., Foldiak, P., Priss, U. (2010), An application of formal concept analysis to semantic neural decoding. Annals of Mathematics and Artificial Intelligence 57(3-4), 233-248.
Endres, D., Adam, R., Giese, M.A. & Noppeney, U. (2012). Understanding the Semantic Structure of Human fMRI Brain Recording with Formal Concept Analysis. Formal Concept Analysis—10th International Conference, ICFCA 2012, Leuven, Belgium, May 7-10, 2012. Proceedings: 96-111.
Lotte, F., Congedo, M., Lécuyer, A., Lamarche, F., & Amaldi, B. (2007). A review of classification algorithms for EEG-based brain—computer interfaces. Journal of neural engineering, 4.
Mourao-Miranda, J., Friston, K. J., & Brammer, M. (2007). Dynamic discrimination analysis: a spatial-temporal SVM. NeuroImage, 36(1), 88.
Naselaris, T., Kay, K. N., Nishimoto, S., & Gallant, J. L. (2011). Encoding and decoding in fMRI. Neuroimage, 56(2), 400-410.
Pereira, F., Detre, G., & Botvinick, M. (2011). Generating text from functional brain images. Frontiers in human neuroscience, 5.
Landauer, T.K., Foltz, P.W., & Lahm, D. (1998). Introduction to Latent Semantic Analysis. Discourse Processes, 25, 259-284.
Notice of Allowance for U.S. Appl. No. 14/489,313, dated Jan. 4, 2017.
International Search Report of the International Searching Authority for PCT/US2015/041744; dated May 25, 2016.
The Written Opinion of the International Searching Authority for PCT/US2015/041744; dated May 25, 2016.
Notification of Transmittal of International Search Report and the Written Opinion of the International Searching Authority for PCT/US2015/041744: dated May 25, 2016.
Olga Prokasheva et al., 'Classification Methods Based on Formal Concept Analysis', In: Workshop co-located with the 35th European Conference on Information Retrieval (ECIR 2013), Mar. 24, 2013, pp. 95-103.
K. Bache and M. Lichman. UCI machine learning repository. University of California, Irvine, School of Information Computer Sciences, 2013, available at h t p : / / archive.ics.uci.edu/ml/datasets/ Iris taken on May 5, 2015.
G. Romano C. Carpineto. Concept Data Analysis: Theory and Applications. Wiley, 2004, Chapter 2.
B. Ganter and R. Wille. Formal Concept Analysis: Mathematical Foundations. Springer-Verlag, Chapter 1, 1998.
Stephanie Guillas, Karell Bertet, and Jean-Marc Ogier. A generic description of the concept lattices' classifier: application to symbol recognition. In GREC: IAPR International Workshop on Graphics Recognition, 2005, pp. 47-60.
Stephanie Guillas, Karell Bertet, and Jean-Marc Ogier. Concept lattice classifier: a first step towards an iterative process of recognition of noised graphic objects. In CLA: Concept Lattices and Their Applications, number section 2, pp. 257-263, 2006.
Olga Prokasheva, Alina Onishchenko, and Sergey Gurov. Classification Methods Based on Formal Concept Analysis. In FDAIR: Formal Concept Analysis Meets Information Retrieval, pp. 95-104, 2013.
M. Swain, S. K. Dash, S. Dash, and A. Mohapatra. An approach for IRIS plant classification using neural network. International Journal of Soft Computing, 2012, pp. 79-89.
Huth, A. G., Nishimoto, S., Vu, A. T., & Gallant, J. K. (2012). A continuous semantic space describes the representation of thousands of object and action categories across the human brain. Neuron, 76(6), pp. 1210-1224.
Mitchell, T. M., Shinkareva, S. V., Carlson, A., Chang, K.-M., Malave, V. L., Mason, R. A., & Just, M. A. (2008). Predicting human brain activity associated with the meanings of nouns. Science, 320(5880), pp. 1191-1195.
G. Romano C. Carpineto. Concept Data Analysis: Theory and Applications. Wiley, Chapter 2, 2004.
Richard O. Duda, Peter E. Hart, and David G. Stork. Pattern Classification. Wiley-Interscience, 2nd edition, Chapter 4, Section 3, 2001.
M. Swain, S. K. Dash, S. Dash, and A. Mohapatra. An approach for IRIS plant classification using neural network. International Journal of Soft Computing, 2012, p. 79-89.
Bache and M. Lichman. UCI machine learning repository. University of California, Irvine, School of Information and Computer Sciences, 2013, available at h t p : / / archive.ics.uci.edu/ml/datasets/ Iris taken on Jul. 17, 2015.
Notification of Transmittal of International Search Report and the Written Opinion of the International Searching Authority for PCT/US2016/031644; dated Aug. 19, 2016.
International Search Report of the International Searching Authority for PCT/US2016/031644; dated Aug. 19, 2016.
The Written Opinion of the International Searching Authority for PCT/US2016/031644; dated Aug. 19, 2016.
Nida Meddouri et al., 'Classification Methods Based on Formal Concept Analysis', In: CLA 2008 (Posters), Oct. 2008, pp. 9-16, <URL: https://www.researchgate.net/publication/262684876_ Classification_Methods_based_on_Formal_Concept_Analysis>.
First Office Action for Chinese Patent Application No. 201580039768.2, dated Sep. 4, 2018.
English translation of the First Office Action for Chinese Patent Application No. 201580039768.2, dated Sep. 4, 2018.
Zhipeng Xie, et al., "Concept lattice based composite classifiers for high predictability," Journal of Experimental and Theoretical Artificial Intelligence, 2002, pp. 143-156.
Response to the First Office Action for Chinese Patent Application No. 201580039768.2, dated Jan. 17, 2019.
English translation of the amended claims for the Response to the First Office Action for Chinese Patent Application No. 201580039768.2, dated Jan. 17, 2019.
Extended supplementary European Search Report comprising of the supplementary European Search Report and non-binding European Search Opinion for European Regional Phase Patent Application No. 15841555.4, dated Mar. 13, 2018.
Zhipeng Xie et al: "Concept lattice based 1-20 composite classifiers for high predictability", Journal of Experimental and Theoretical Artificialintelligence, vol. 14, No. 2-3, Apr. 1, 2002 (Apr. 1, 2002), pp. 143-156.
Kaburlasos Vassilis G et al: "FCknn: A granular knn classifier based on formal concepts", 2014 IEEE International Conference on Fuzzy Systems (Fuzz-IEEE), Jul. 6, 2014 (Jul. 6, 2014), pp. 61-68.

(56) References Cited

OTHER PUBLICATIONS

Van Erp M et al: An overview and 1-28 comparison of voting methods for pattern recognition 11, Frontiers in Handwriting Recognition, 2002. Proceedings. Eighth Intern Ational Workshop on Aug. 6-8, 2882, Piscataway, NJ, USA,IEEE, Aug. 6, 2802 (2802-88-86), pp. 195-208.
Response to the Opinion accompanying the extended supplementary European search report for European Regional Phase Patent Application No. 15841555.4, dated Jan. 11, 2019.

\* cited by examiner

| ANIMALS | preying | flying | bird | mammal |
|---|---|---|---|---|
| Lion | x | | | x |
| Finch | | x | x | |
| Eagle | x | x | x | |
| Hare | | | | x |
| Ostrich | | | | |

|  | Size small (ss) | Size medium (sm) | Size large (sl) | Distance near (dn) | Distance far (df) | Moon (my) | No moon (nm) |
|---|---|---|---|---|---|---|---|
| Mercury | X |  |  | X |  |  | X |
| Venus | X |  |  | X |  |  | X |
| Earth | X |  |  | X |  | X |  |
| Mars | X |  |  | X |  | X |  |
| Jupiter |  |  | X |  | X | X |  |
| Saturn |  |  | X |  | X | X |  |
| Uranus |  | X |  |  | X | X |  |
| Neptune |  | X |  |  | X | X |  |
| Pluto | X |  |  |  | X | X |  |

FIG. 4A

| Data | Petal length (PL) | | | Petal width (PW) | | | Sepal Length (SW) | | | Iris Class | | |
|---|---|---|---|---|---|---|---|---|---|---|---|---|
| | PL ≤ 2.3 | 2.3 < PL < 4.6 | 4.6 ≤ PL | PW ≤ .8 | .8 < PW < 1.6 | 1.6 ≤ PW | SW ≤ 1.5 | 1.5 < SW < 3 | 3 ≤ SW | Setosa | Versicolor | Virginica |
| 1 | | x | | | | | | | | x | | |
| 2 | | | x | | | x | | x | | | | x |
| 3 | | | x | | | x | x | | | | x | |
| 4 | | | x | | | x | x | | | | | x |
| 5 | | x | | | | x | x | | | x | | |
| 6 | | | x | | | x | x | | | | x | |
| 7 | | x | | | | x | x | | | x | | |
| 8 | | | x | | | x | | x | | | | x |
| 9 | | | x | | | | | | | | | |

FIG. 6A

GENERAL FORMAL CONCEPT ANALYSIS (FCA) FRAMEWORK FOR CLASSIFICATION

CROSS-REFERENCE TO RELATED APPLICATIONS

This is a Continuation-in-Part Application of U.S. Non-Provisional application Ser. No. 14/489,313, filed in the United States on Sep. 17, 2014, entitled, "Mapping Across Domains to Extract Conceptual Knowledge Representation from Neural Systems," which is incorporated herein by reference in its entirety.

This is ALSO a Non-Provisional Application of U.S. Provisional Application No. 62/028,171, filed in the United States on Jul. 23, 2014, entitled, "A General Formal Concept Analysis (FCA) Framework for Classification," which is incorporated herein by reference in its entirety.

GOVERNMENT LICENSE RIGHTS

This invention was made with government support under U.S. Government Contract Number FA8650-13-C-7356. The government has certain rights in the invention.

BACKGROUND OF INVENTION

(1) Field of Invention

The present invention relates to a system for data classification and, more particularly, to a system for data classification using formal concept analysis (FCA).

(2) Description of Related Art

Classification through machine learning is a very important field of study, as it allows for systems to evolve the ability to solve difficult problems, such as face recognition, anomaly detection, and failure prediction. Classification may be described as the problem of identifying which of a set of categories applies to a new observation, based on a training set of data.

Formal concept analysis (FCA) is a principled way of deriving a partial order on a set of objects each defined by a set of attributes. It is a technique in data and knowledge processing that has applications in data visualization, data mining, information retrieval, and knowledge management (see the List of Incorporated Literature References, Literature Reference No. 3). The principal with which it organizes data is a partial order induced by an inclusion relation between object's attributes. In addition, FCA admits rule mining from structured data. It is widely applied for data analysis, especially in Germany and France.

Literature Reference No. 7 provides a survey of FCA-type classification tools and concludes that none of them work well, generally demonstrating high error rates. Details of the algorithms are sparse and development and analysis is often done in French or German.

Further, Literature Reference No. 5 proposes a specific instantiation of an FCA classifier for classification of simple symbol recognition. The work relies on finding a single node within the lattice upon which to do classification, making it apparent that in a more complex, noisy setting, the classification is likely to fail. This type of data certainly comes up in the biological realm, such as electroencephalography (EEG), functional magnetic resonance imaging blood-oxygen-level dependent (fMRI BOLD), functional near infrared spectroscopy (fNIRS), and magnetoencephalography (MEG), where the noise to signal ratio is very large.

Literature Reference No. 6 proposes an iterative version of FCA classification, which yields good results in their specific test problem (again, simple symbol classification) but suffers from a potentially large number of expensive iterations, thus requiring substantial computational time.

Thus, a continuing need exists for an efficient system for classifying classes that are hierarchical in nature using formal concept analysis such that the hierarchical structures of the data are revealed and exploited.

SUMMARY OF THE INVENTION

The present invention relates to a system for data classification and, more particularly, to a system for data classification using formal concept analysis (FCA). The system comprises one or more processors and a memory having instructions such that when the instructions are executed, the one or more processors perform multiple operations. The system generates with the one or more processors, in a training phase, a formal concept analysis (FCA) classification lattice using a set of training data and a plurality of classifications corresponding to the set of training data. Using the structure of the FCA classification lattice, a classification of a set of input data is generated during a classification phase.

In another aspect, in the training phase, a context table is generated from the set of training data, the context table having rows of object labels and columns of attribute labels. For each training presentation, in the training phase, at least one class column for a classification corresponding to the training presentation is appended to the context table. The FCA classification lattice is generated from the context table.

In another aspect, during generation of the FCA classification lattice, the at least one class column is treated as a normal attribute, wherein a sub-structure comprising a plurality of nodes within the FCA classification lattice that is spanned by a given class-attribute is associated with the corresponding classification.

In another aspect, the system generates, in the classification phase, a presentation context vector, $m_p$, from the set of test data, wherein $m_p$ is a set of attributes associated with a presentation p in the set of test data. In the classification phase, a set of voting nodes in the FCA classification lattice is selected and used to vote for a classification value for the presentation p.

In another aspect, the set of voting nodes is selected according to a selection function operating on at least $m_p$ and the FCA classification lattice.

In another aspect, a classification value, c, is voted on according to a voting function operating on at least the output of the selection function, the FCA classification lattice, and $m_p$.

In another aspect, the voting function returns a sum of an associated class value of each of the set of voting nodes.

In another aspect, each associated class value is weighted by a number of attributes that it shares with the presentation p.

In another aspect, each voting node has an extent comprising a set of objects, wherein the voting function returns a sum of an associated class value of each voting node, the sum is normalized by a number of objects within the voting node's extent, and the normalized sums across all voting nodes are then summed.

In another aspect, each voting node has an intent comprising a set of attributes, and the associated class value for each voting node is weighted by a number of attributes in its intent.

In another aspect, the set of training data includes objects having attributes, and the FCA classification lattice is generated by treating the plurality of classifications as attributes of objects in the training data.

In another aspect, the set of input data is acquired using at least one of an fMRI sensor, an image sensor, and a sound sensor, and wherein the classification is performed for purposes of at least one of object recognition, image recognition, and sound recognition.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 3 is an illustration of a first context table according to various embodiments;

FIG. 4A is an illustration of a second context table according to various embodiments;

FIG. 6A is an illustration of a context table appended with class columns according to various embodiments.

DETAILED DESCRIPTION

Figure 1:
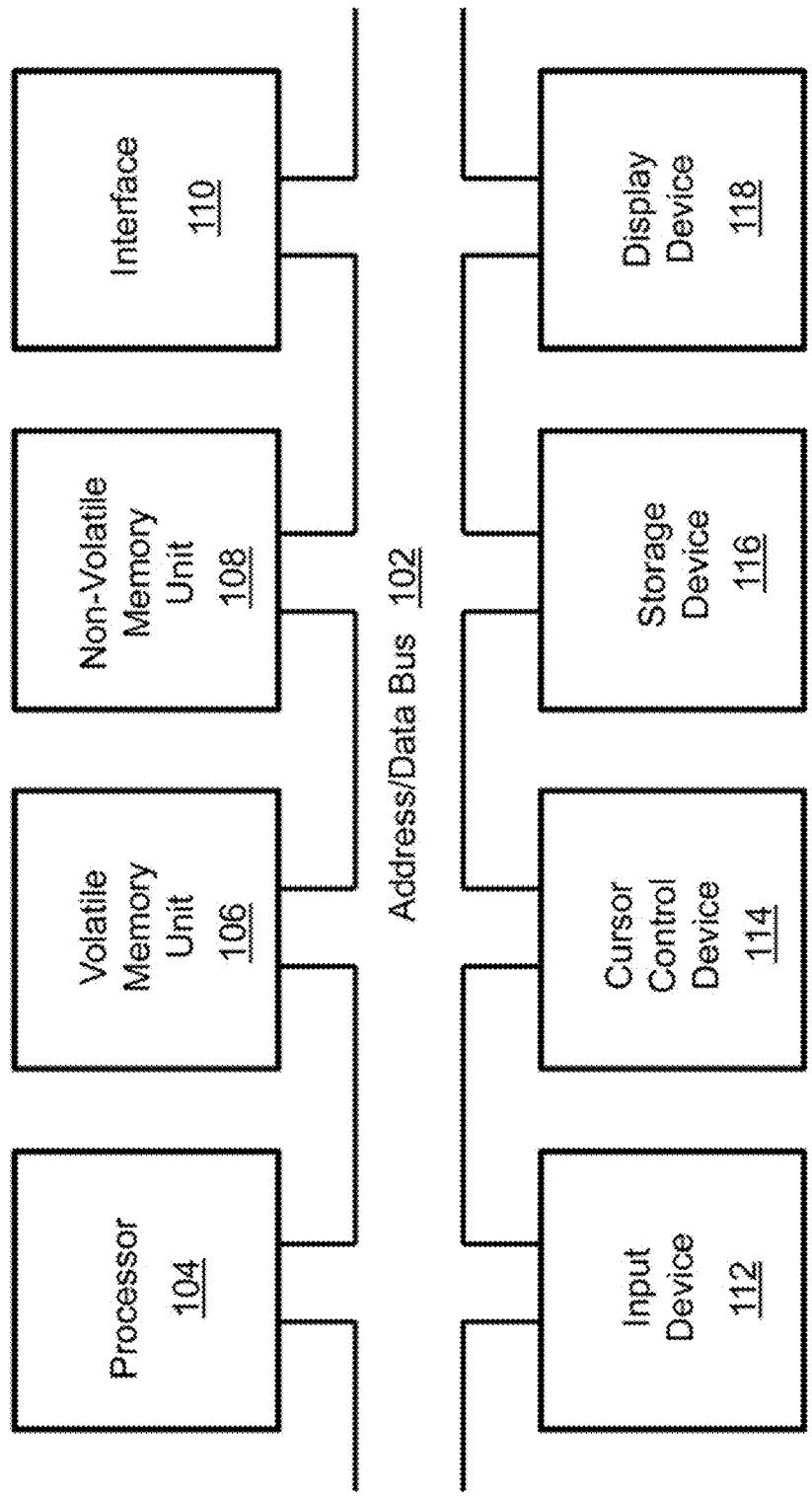
FIG. 1 is a block diagram depicting the components of a system for data classification according to various embodiments.

The present invention relates to a system for data classification and, more particularly, to a system for data classification using formal concept analysis (FCA). The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. V. Arulmozhi. Classification task by using Matlab Neural Network Tool Box—A beginners. International Journal of Wisdom Based Computing, 2011.
2. K. Bache and M. Lichman. UCI machine learning repository. University of California, Irvine, School of Information and Computer Sciences, 2013, available at htp://archive.ics.uci.edu/ml/datasets/Iris taken on May 5, 2015.
3. G. Romano C. Carpineto. Concept Data Analysis: Theory and Applications. Wiley, 2004.
4. B. Ganter and R. Wille. Formal Concept Analysis: Mathematical Foundations. Springer-Verlag, Chapters 0-2, pages 1-94, 1998.
5. Stephanie Guillas, Karell Bertet, and Jean-Marc Ogier. A generic description of the concept lattices' classifier:

application to symbol recognition. In GREC: IAPR International Workshop on Graphics Recognition, 2005.
6. Stephanie Guillas, Karell Bertet, and Jean-Marc Ogier. Concept lattice classifier: a first step towards an iterative process of recognition of noised graphic objects. In CLA: Concept Lattices and Their Applications, number section 2, pages 257-263, 2006.
7. Olga Prokasheva, Alina Onishchenko, and Sergey Gurov. Classification Methods Based on Formal Concept Analysis. In FDAIR: Formal Concept Analysis Meets Information Retrieval, pages 95-104, 2013.
8. M. Swain, S. K. Dash, S. Dash, and A. Mohapatra. An approach for IRIS plant classification using neural network. International Journal of Soft Computing, 2012.

(2) Principal Aspects

The present invention has three "principal" aspects. The first is a system for data classification using formal concept analysis (FCA). The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. The one or more processors may have an associated memory with executable instructions encoded thereon such that when executed, the one or more processors perform multiple operations. The associated memory is, for example, a non-transitory computer readable medium.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
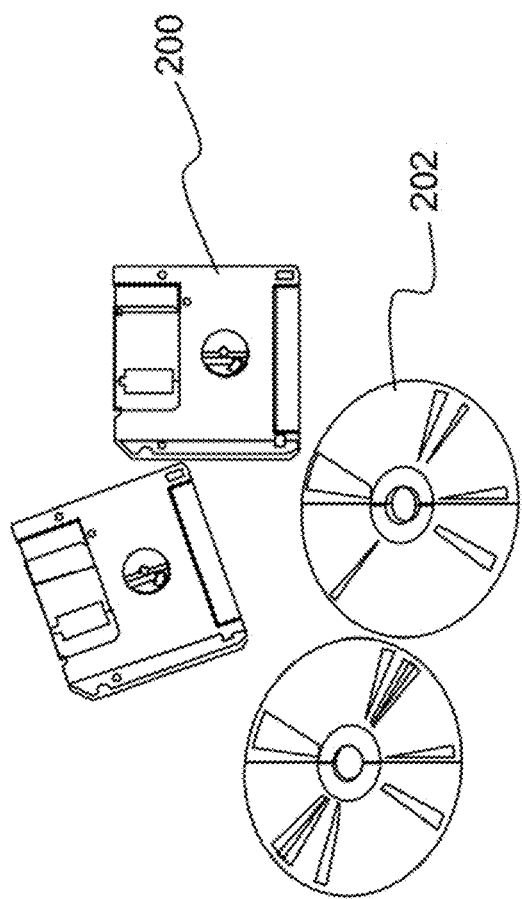
FIG. 2 is an illustration of a computer program product according to various embodiments.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Formal concept analysis (FCA) is a principled way of deriving a concept hierarchy or formal ontology from a collection of objects and their properties or attributes. It is a creation of a partial order of the objects based on an ordering relation defined by set inclusion of attributes. Formally, a context=(G, M, I) consists of two sets G and M and a relation I, called the incidence relation, between them. The elements of G are called the objects, and the elements of M are called the attributes (see Literature Reference No. 4). If an object $g \in G$ has the attribute $m \in M$, then write gIm or (g, m)$\in$I. A context can be represented by a cross table, or context table, which is a rectangular table where the rows are headed by objects and the columns are headed by attributes, an example of which is illustrated in FIG. 3. An "X" in the intersection of row g and column m means that object g has attribute m. For a set $A \subset G$ of objects, one can define $A'=\{m \in M | gIm \forall g \in A\}$. In words, for some subset of objects A, A' represents the set of attributes common to all the objects in A. Correspondingly, one can define $B'=\{g \in G | gIm \forall m \in M\}$. In words, for some subset of attributes B, B' represents the set of objects which have all the attributes in B.

A formal concept can now be defined. A formal concept of the context (G, M, I) is a pair (A, B) with $A \subset G$, $B \subset M$, $A'=B$, and $B'=A$. A is called the extent, and B is called the intent of the concept (A, B). (G, M, I) denotes the set of all concepts of the context (G, M, I). A concept is represented within a context table by a maximal contiguous block of "X"'s after arbitrary rearrangement of rows and columns, as shown in FIG. 3. Algorithms for determining concept lattices are described in Literature Reference Nos. 3 and 4. Mathematically, the key aspect of concept lattices is that a concept lattice $\mathfrak{B}$ (G, M, I) is a complete lattice in which the infimum and supremum are, respectively, given by:

$$\bigwedge_{t \in T}(A_t, B_t) = (\bigcap_{t \in T} A_t, (\bigcup_{t \in T} B_t)'') \text{ and}$$

$$\bigvee_{t \in T}(A_t, B_t) = ((\bigcup_{t \in T} A_t)'', \bigcap_{t \in T} B_t).$$

Referring to FIG. 3, an object (e.g., lion) has the attributes from the columns corresponding to the "X"'s (e.g., preying, mammal). The contiguous block of grey 300 is maximal, under any rearrangements of rows and columns, and forms a formal concept. The supremum is called the join and is written $z \lor y$ or sometimes $\lor S$ (the join of the set S). The infimum is called the meet and is written $z \land y$ or sometimes $\land S$ (the meet of the set S). An extensive description of formal concept analysis is given in Literature Reference No. 4.

(3.1) Example of a Context and Concept Lattice

A concept lattice is a mathematical object represented by (G, M, I) as described above. A concept lattice can be visualized by a Hasse diagram, a directed acyclic graph where the nodes represent concepts and lines represent the inclusion relationship between the nodes. In the case of formal concept analysis, the Hasse diagram has a single top node representing all objects (given by G), and a single bottom node representing all attributes (given by M). All the nodes in between represent the various concepts comprised of some subset of objects and attributes. A line between two nodes represents the order information. The node above is considered greater than the node below. In a Hasse diagram, a node in with attribute set m and object set g has the following properties:

m=g', is the set of all attributes shared by every object in g.

g=m', is the set of all objects that have all attributes in m.

Every child node of n has all of m in its intent.

Every parent node of n has all of g in its extent.

Thus, the ordering of the nodes within the lattice n>k implies that the extent of n is contained in the extent of k and, equivalently, the intent of n is contained in the intent of k. The upset of a node n consists of all of its ancestor nodes within the lattice. The downset of n consists of all its children nodes within the lattice.

Figure 4B:
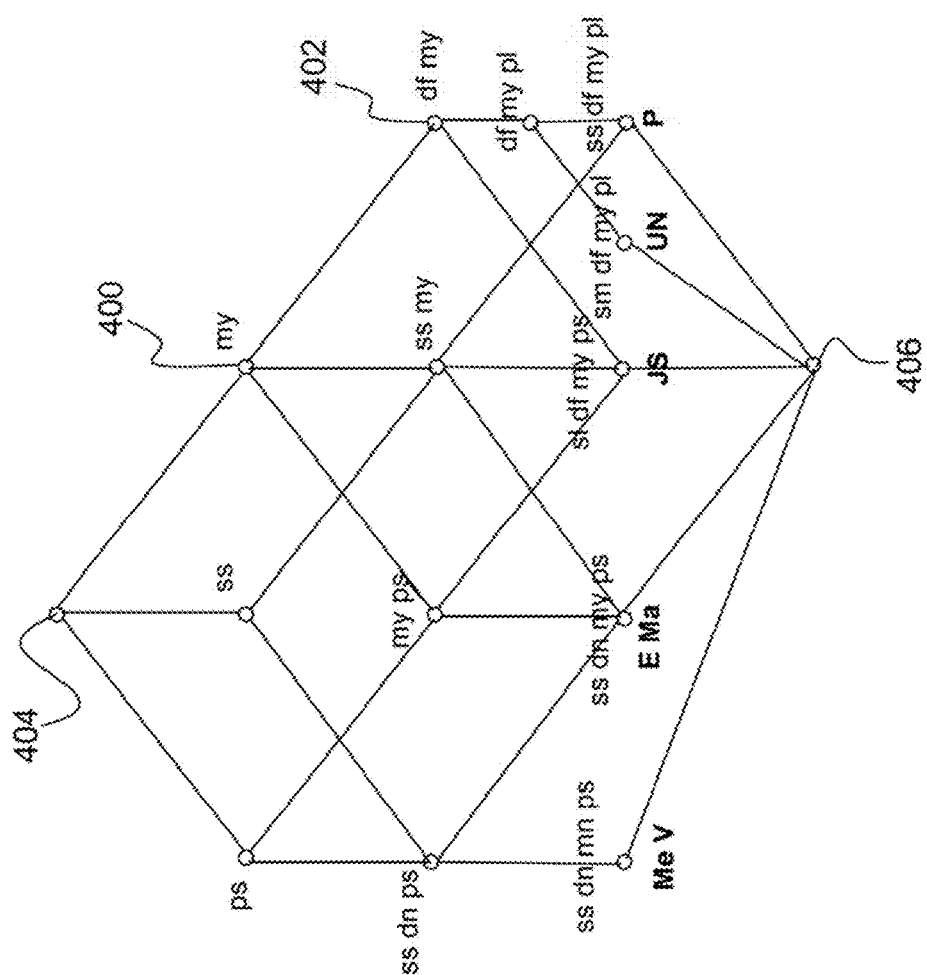
FIG. 4B is an illustration of a lattice resulting from the data in the second context table according to various embodiments.

FIGS. 4A and 4B illustrate a context table and the corresponding Hasse diagram of the concept lattice induced by the formal content, respectively. The objects are nine planets, and the attributes are properties, such as size, distance to the sun, and presence or absence of moons. Each node (represented by circles, such as elements 400 and 402) corresponds to a concept, with its objects consisting of the union of all objects from nodes connecting from above, and attributes consisting of the intersection of all attributes of all the nodes connecting from below. Ultimately, the top most node 404 contains all the objects, G, and no attributes. Correspondingly, the bottom most node 406 contains all the attributes, M, and no objects.

(4) Specific Details of the Invention (4.1) Classification with FCA

In order to leverage FCA in classification, the system according to various embodiments appends a set of class columns to a context table, where each training presentation has at least one of the columns marked for the corresponding class. In the lattice construction process, these classes are treated as normal attributes. In the completed lattice, the sub-structure spanned by a given class-attribute is then associated with the corresponding class. This can be leveraged for classification through a node-voting scheme. Each of these aspects will be described in further detail below.

FCA classification according to various embodiments proceeds as follows.
  A. Training phase
    1. Build context table from training data.
    2. Append class columns for each class type, filling in the corresponding context values for each training presentation.
    3. Build the FCA classification lattice from the context table, call it CLAT.
  B. Classification phase
    1. Build context vector, $m_p$, from the data for presentation p ($m_p$ represents the attributes of p).
    2. Select a set of voting nodes N=SelectNodes($m_p$, CLAT).
    3. Use the nodes to vote for the classification value to be returned, $$c=\text{Vote}(m_p, N, \text{CLAT}).$$

Figure 5:
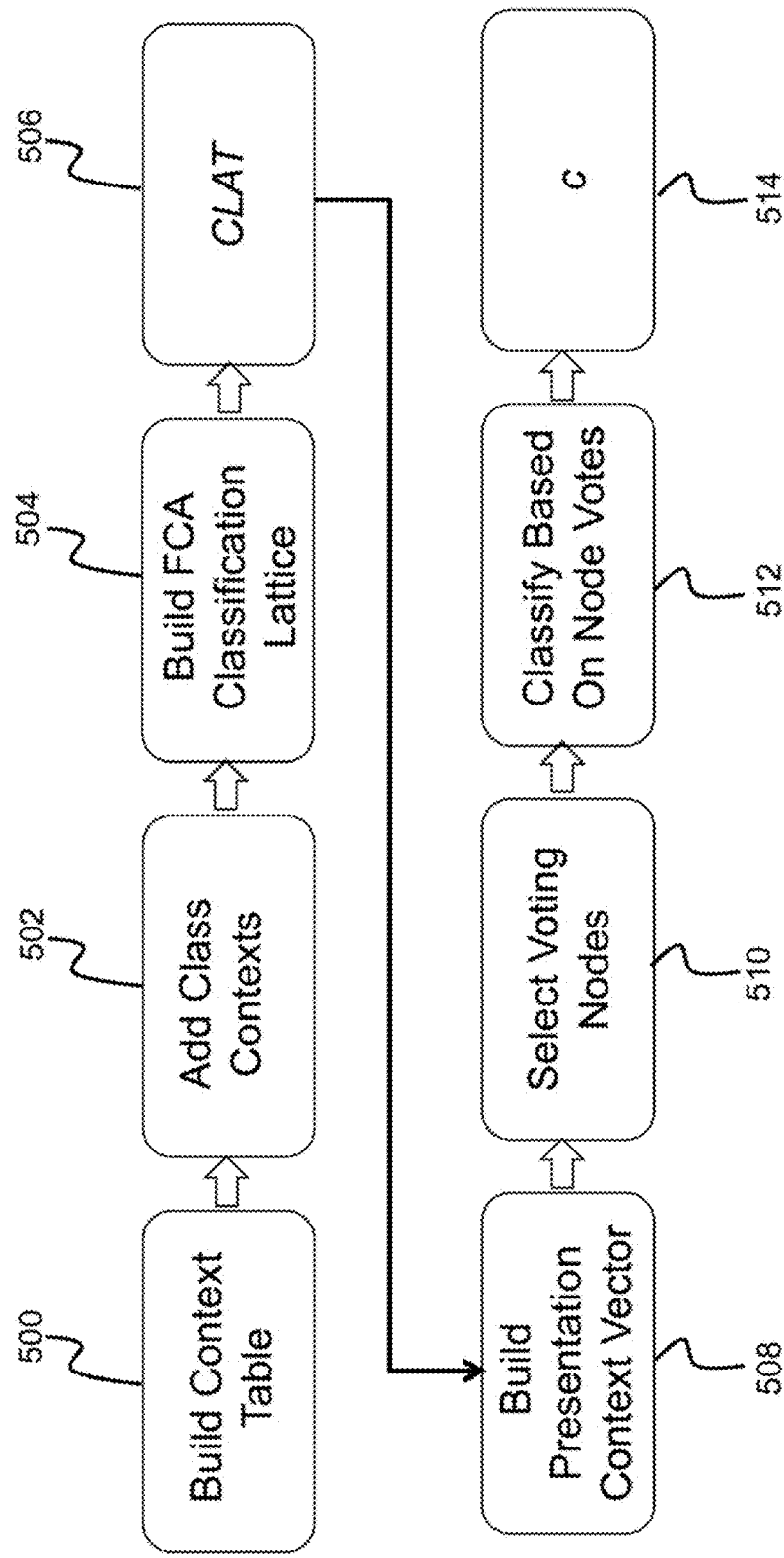
FIG. 5 is an illustration of formal concept analysis (FCA) lattice classification according to various embodiments.

FIG. 5 illustrates a flowchart of the FCA lattice classification according to various embodiments. In a first operation 500, a context table is built (generated). In a second operation 502, columns of class contexts for each class type are appended to the context table. In a third operation 504, an FCA classification lattice, comprising a plurality of nodes, is generated from the data in the context table, wherein the FCA classification lattice is denoted CLAT 506. As described above, in a fourth operation 508, a presentation context vector is generated. A set of voting nodes in CLAT is selected in a fifth operation 510. Finally, the selected nodes from the fifth operation 510 is used to vote for a classification value to be returned in a sixth operation 512, the classification result being denoted c 514.

Figure 6B:
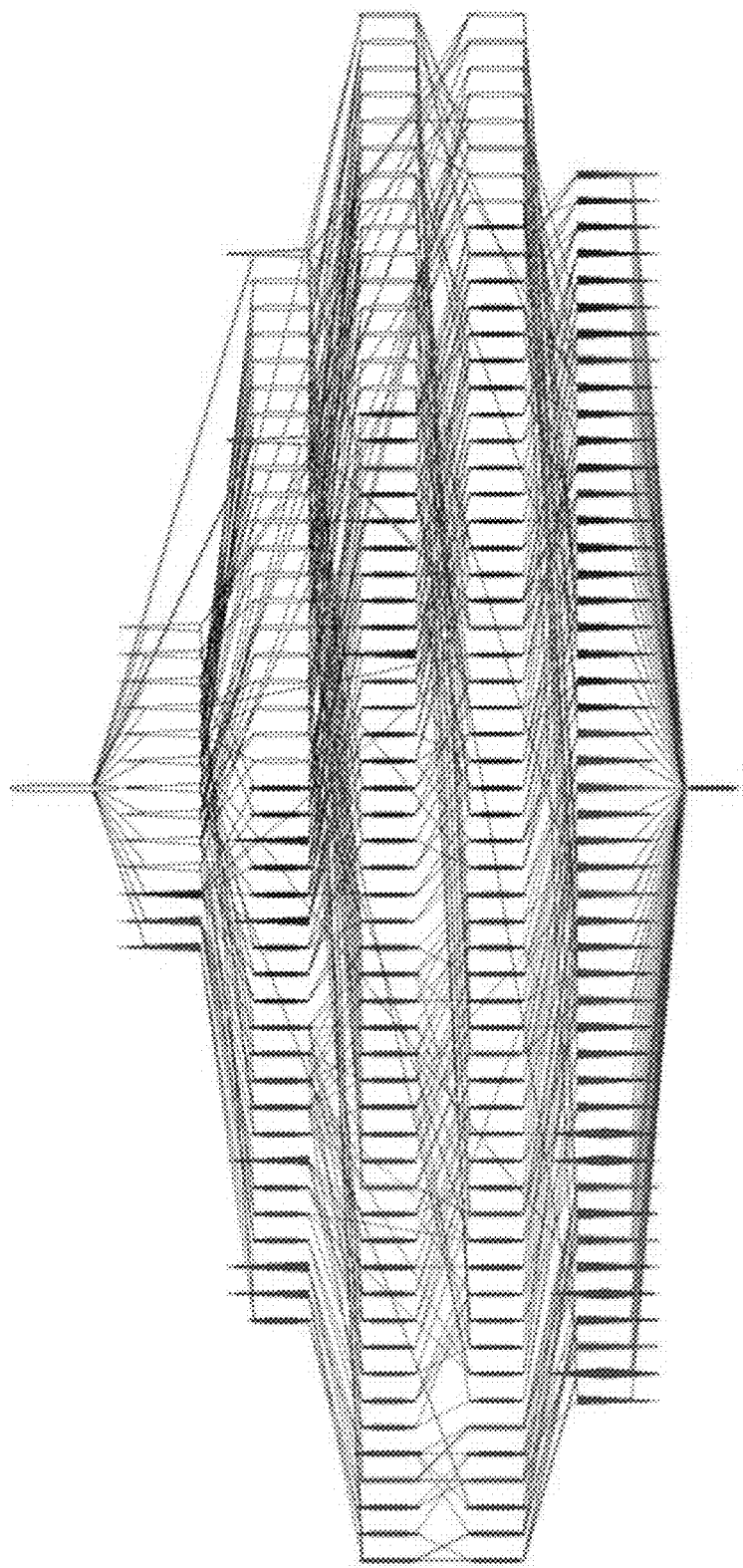
FIG. 6B is an illustration of a lattice resulting from the data in the context table appended with class columns according to various embodiments.

For illustrative purposes, FIGS. 6A and 6B illustrate a non-limiting example of a context table of data from the Iris data set having appended class columns (FIG. 6A) and a FCA classification lattice generated from the data (FIG. 6B). The Iris data set is available in the University of California Irvine (UCI) machine learning repository (see Literature Reference No. 2 for the Iris data set). In this data set, the goal is to classify the Iris type based on measurements, such as "sepal length", "sepal width", "and petal length". The table in FIG. 6A depicts a non-limiting example of a context table which has been appended with a set of class columns. In this example, the objects are the measurements (i.e., petal length, petal width, sepal length) and the classes are the Iris types: Setosa, Versicolor, and Virginica.

The FCA classification lattice that is generated according to various embodiments as shown in FIG. 6B depicts the sub-structures which span a given class-attribute as described above. For instance, the FCA classification lattice is highlighted to demonstrate the sub-structures with red representing Iris Setosa, green representing Iris Versicolor, and blue representing Iris Virginica.

(4.2) Example Atomic Functions

The function SelectNodes and Vote can be varied and still provide success within this framework. The underlying classification problem should be considered in picking these functions. Below, several examples are given. The following notation is used: define the sets $m_n$ and $g_n$ to be the intent and extent, respectively, of the formal concept represented by node n∈CLAT. Likewise, $m_p$ is taken to be the set of attributes associated with presentation p. Further, $e_m$:=entry (m) is the entry node of attribute m in CLAT, denoting the node within the lattice that itself has m in its intent, but has no ancestors with m in their intent. Graphically, $e_m$ is the highest node in the lattice that has m in its intent. With this notation, define $\varepsilon = \{e_m | m \in m_p\}$ to be the set of all entry nodes for a set of attributes. With this notation, the following are some possible algorithms that can be used for SelectNodes and Vote:

SelectNodes Function=
  MeetSelect: The following is the simplest example of SelectNodes and returns the meet node of the presentation attributes, given by:

$$\text{MeetSelect}(m_p, \text{CLAT}) = \wedge \varepsilon.$$

This node selection (SelectNodes) algorithm performs poorly on difficult problems with noisy data (such as fMRI BOLD data). This is due to the fact that while a meet is guaranteed to exist because of the completeness of the lattice, the meet is often the bottom of the lattice, which contains all attributes and no objects. This does not help in classification.

AttributeSpanSelect: This is the next simplest example. This function just returns the set of all nodes that share attributes with p:

$$\text{AttributeSpanSelect}(m, \text{CLAT}) = \{n | m_n \cap m_p \neq \emptyset\}.$$

UpsetFilterSelect: This algorithm finds what is termed the horizon of the attribute span. In words, it finds the nodes that are deepest in the lattice while still sharing attributes with the presentation p. The idea behind this is that nodes that are deeper in the lattice contain more attributes (in particular, more attributes in common with p), and, thus, are more specific in their classification abilities. To these ends, the horizon can be computed by using a novel upset filtering technique. The upset(n) is a function that returns the set of ancestors of the node n, which is the set $\{k - m_k \subset m_n\}$. Thus, any node k in the upset will share all of its attributes with n, so n should be a better classifier of p, with one caveat, described below. To proceed, let $|k|_p = |m_p \cap m_k|$ be the rank of the node k. With this notation, the algorithm begins by selecting an initial set of nodes:

$$N_{init} = \text{AttributeSpanSelect}(m_p, \text{CLAT}).$$

Then, the list of nodes is sorted in descending order by rank, N:=Sort($N_{init}$). Define Horz={ }. The UpsetFilter algorithm continues as:
    Require: N sorted, Horz={ }
    1. while N≠∅ do
    2. $n_0$:=N[0]
    3. $n_g$:=true
    4. U:=Upset($n_0$)
    5. for all k∈U∪N do
    6. if $|k|_p < |n_0|_p$ then
    7. N←N\{k}
    8. else
    9. $n_g$=false
    10. end if
    11. end for
    12. if $n_g$ then
    13. Horz←Horz∪{$n_0$}
    14. end if
    15. N←N\{$n_0$}
    16. end while
    17. return Horz In line 13, notice that $n_0$ (the candidate node) is added to Horz only if $n_g$ is true. $n_g$ is the good-node flag, indicating whether the current node should be kept for voting which is the case only if it has a strictly higher rank than its ancestors. To begin the iteration, it is assumed that the node is good, but if an ancestor k that has the same rank as the candidate node is found, that means that the candidate node over-classifies. The two nodes will have the same rank if and only if they share the exact same attributes with the presentation p. Since $n_0$ is a child of k, this implies that $n_0$ has strictly more attributes than k, and the increase in attributes does not help to classify p. Thus, k will be a better classifier (and is kept in the list) than $n_0$, so $n_0$ is thrown out and the process moves on. $n_0$ can still be leveraged to filter the node set without loss of potential horizon nodes.

Vote Function=
ClassVote: This returns the sum of the associated class value of each of the voting nodes, which are generated via the lattice construction process from the class columns within the context table.
AttributeWeightClassVote: This returns the same values as ClassVote, except that each vote is weighted by the number of attributes (in its intent) that it shares with the presentation p.
ObjectVote: Each voting node votes based on the objects within its extent. For each object in the nodes extent, the associated class value is used. These votes are summed and normalized by the number of objects within the node's extent, so nodes higher in the lattice do not have stronger voting power. The votes across all voting nodes are then summed.
AttributeWeightedObjectVote: This returns the same as ObjectVote except the node votes are weighted by the number of attributes in their respective intent.

The above are a few of the possibilities for the respective functions. In practice, the choice largely depends on the underlying problem.

(4.3) Experimental Studies (4.3.1) Iris

The system according to various embodiments has been successfully applied to the Iris data set available in the University of California Irvine (UCI) machine learning repository (see Literature Reference No. 2 for the Iris data set). In this data set, the goal is to classify the iris type based on "sepal length", "sepal width", "petal length", and "petal width". Using the present invention, it is possible to classify the data set with 100% accuracy with a certain choice of attributes. Though 100% is a great classification result, the corresponding attribute choice resulted in a relatively large lattice of over 500 nodes. However, because the system according to various embodiments makes use of the data's underlying structure, a high result of 97% can be achieved with a much smaller lattice, of about 50 nodes, through the flexibility of feature choice and the underlying atomic functions. This is a significantly greater result than that received by the prior art, such as published SOA (service-oriented architecture) classification techniques as used on this data set (which are described in Literature Reference Nos. 1 and 8).

(4.3.2) fMRI BOLD Responses fMRI BOLD responses are used to represent a level of neural activity within the brain in a non-invasive way. Various stimuli (e.g., spoken words, written words, images) are presented, representing semantic or conceptual input. During this presentation, the brain's responses are recorded. A baseline of null activity is subtracted out, and the difference between this neutral brain state and the brain's state in response to the stimuli is extracted. The set of stimuli (whether individual words of sentences, spoken words, images, etc.) represent the objects of FCA, and the extracted fMRI BOLD responses for the voxels within the brain represent the attributes of the objects. FCA classification can then be applied to the fMRI BOLD responses in an effort to classify the thought process of a human. The training data consists of a set of object presentations and the resulting voxel recordings. After some pre-processing, the data is compiled into a context table, from which the FCA lattice is built. This concludes the training phase, and the testing phase consists of new object presentations, but without a known classification of the object. The FCA classification algorithm is then used to extract predictions from the voxel data as to what the object presentation is.

This process can be bootstrapped by compiling a semantic lattice for the same objects, using a known expert derived ontology, such as WordNet. The two lattices can then be combined together into a single lattice encompassing both neural data and semantic data. This bootstrapped system would serve as a more thorough classification system, while simultaneously revealing similarities between neural and semantic architectures. This process of combining lattices into a single lattice encompassing neural data and semantic data was described in U.S. Non-Provisional application Ser. No. 14/489,313, which is hereby incorporated by reference as though fully set forth herein.

As machine learning is an important field of study with applications to error detection, prediction, pattern classification, as well as others, the system according to various embodiments is likewise widely applicable, excelling within a hierarchical setting. As a non-limiting example, FCA classification is instrumental to the classification of fMRI BOLD responses to presented stimuli. Given a set of trial data, the present invention builds a structured system in which neural responses correspond to different classes of objects, providing an efficient analysis tool that can reliably classify new object presentation into their respective classes.

Furthermore, the invention described herein allows for knowledge discovery, yielding such concepts as CAT and DOG are MAMMALS based on the hierarchical structure that underlies the classification process.

In addition, the present invention can be utilized to classify inefficiencies within a production line or a circuit design, since many inefficiencies are dependency based, resulting from the hidden structures within the production process.

In various embodiments, the systems and methods described herein may be applied to applications for classification problems. For example, various embodiments may be used as part of data mining procedures, image recognition, medical imaging and analysis, optical character recognition, video tracking, drug discovery and development, speech recognition, handwriting recognition, biometric identification, biological classification, natural language processing, document classification, credit scoring, and/or pattern recognition.

What is claimed is:

1. A system for data classification using formal concept analysis (FCA), the system comprising:
one or more processors having associated memory with executable instructions encoded thereon such that when executed, the one or more processors perform operations of:
using the structure of a formal concept analysis (FCA) classification lattice, generating a classification of a set of input data during a classification phase;
generating, in the classification phase, a presentation context vector, $m_p$, from a set of test data, wherein $m_p$ is a set of attributes associated with a presentation p in the set of test data;
selecting, in the classification phase, a set of voting nodes in the FCA classification lattice; and using, in the classification phase, the set of voting nodes to vote for a classification value for the presentation p.

2. The system as set forth in claim 1, wherein the one or more processors further perform operations of:
generating, in a training phase, a context table from a set of training data, the context table having rows of object labels and columns of attribute labels;
for each training presentation, appending, in the training phase, at least one class column for a classification corresponding to the training presentation to the context table; and
generating a FCA classification lattice from the context table.

3. The system as set forth in claim 2, wherein during generation of the FCA classification lattice the at least one class column is treated as a normal attribute, and wherein a sub-structure comprising a plurality of nodes within the FCA classification lattice that is spanned by a given class-attribute is associated with the corresponding classification.

4. The system as set forth in claim 1, wherein the set of voting nodes is selected according to a selection function operating on at least $m_p$ and the FCA classification lattice.

5. The system as set forth in claim 4, wherein a classification value, c, is voted on according to a voting function operating on at least the output of the selection function, the FCA classification lattice, and $m_p$.

6. The system as set forth in claim 5, wherein the voting function returns a sum of an associated class value of each of the set of voting nodes.

7. The system as set forth in claim 6, wherein each associated class value is weighted by a number of attributes that it shares with the presentation p.

8. The system as set forth in claim 5, wherein each voting node has an extent comprising a set of objects, and wherein the voting function returns a sum of an associated class value of each voting node, wherein the sum is normalized by a number of objects within the voting node's extent, wherein the normalized sums across all voting nodes are then summed.

9. The system as set forth in claim 8, wherein each voting node has an intent comprising a set of attributes, and wherein the associated class value for each voting node is weighted by a number of attributes in its intent.

10. The system as set forth in claim 2, wherein the set of training data includes objects having attributes, and the FCA classification lattice is generated by treating the plurality of classifications as attributes of objects in the training data.

11. The system as set forth in claim 1, wherein the set of input data is acquired using at least one of an fMRI sensor, an image sensor, and a sound sensor, and wherein the classification is performed for purposes of at least one of object recognition, image recognition, and sound recognition.

12. A computer-implemented method for data classification using formal concept analysis (FCA), the computer-implemented method using one or more processors to perform operations of:
using the structure of a FCA classification lattice, generating classification of a set of input data during a classification phase;
generating, in the classification phase, a presentation context vector, $m_p$, from a set of test data, wherein $m_p$ is a set of attributes associated with a presentation p in the set of test data;
selecting, in the classification phase, a set of voting nodes in the FCA classification lattice; and
using, in the classification phase, the set of voting nodes to vote for a classification value for the presentation p.

13. The method as set forth in claim 12, wherein the one or more processors further perform operations of:
generating, in a training phase, a context table from a set of training data, the context table having rows of object labels and columns of attribute labels;
for each training presentation, appending, in the training phase, at least one class column for a classification corresponding to the training presentation to the context table; and
generating a FCA classification lattice from the context table.

14. The method as set forth in claim 13, wherein during generation of the FCA classification lattice the at least one class column is treated as a normal attribute, and wherein a sub-structure comprising a plurality of nodes within the FCA classification lattice that is spanned by a given class-attribute is associated with the corresponding classification.

15. A computer program product for data classification using formal concept analysis (FCA), the computer program product comprising:
computer-readable instructions stored on a non-transitory computer-readable medium that are executable by a computer having one or more processors for causing the one or more processors to perform operations of:
using the structure of a FCA classification lattice, generating a classification of a set of input data during a classification phase;
generating, in the classification phase, a presentation context vector, $m_p$, from a set of test data, wherein $m_p$ is a set of attributes associated with a presentation p in the set of test data;
selecting, in the classification phase, a set of voting nodes in the FCA classification lattice; and
using, in the classification phase, the set of voting nodes to vote for a classification value for the presentation p.

16. The computer program product as set forth in claim 15, further comprising instructions for causing the one or more processors to perform operations of:
generating, in a training phase, a context table from a set of training data, the context table having rows of object labels and columns of attribute labels;
for each training presentation, appending, in the training phase, at least one class column for a classification corresponding to the training presentation to the context table; and
generating the FCA classification lattice from the context table.

17. The computer program product as set forth in claim 16, wherein during generation of the FCA classification lattice the at least one class column is treated as a normal attribute, and wherein a sub-structure comprising a plurality of nodes within the FCA classification lattice that is spanned by a given class-attribute is associated with the corresponding classification.

18. A system for data classification using formal concept analysis (FCA), the system comprising:
one or more processors having associated memory with executable instructions encoded thereon such that when executed, the one or more processors perform operations of:

generating with the one or more processors, in a training phase, a formal concept analysis (FCA) classification lattice using a set of training data and a plurality of classifications corresponding to the set of training data; and using the structure of the FCA classification lattice, generating a classification of a set of input data during a classification phase;

generating, in the training phase, a context table from the set of training data, the context table having rows of object labels and columns of attribute labels;

for each training presentation, appending, in the training phase, at least one class column for a classification corresponding to the training presentation to the context table;

generating the FCA classification lattice from the context table;

wherein during generation of the FCA classification lattice the at least one class column is treated as a normal attribute, and wherein a sub-structure comprising a plurality of nodes within the FCA classification lattice that is spanned by a given class-attribute is associated with the corresponding classification;

generating, in the classification phase, a presentation context vector, $m_p$, from a set of test data, wherein $m_p$ is a set of attributes associated with a presentation p in the set of test data;

selecting, in the classification phase, a set of voting nodes in the FCA classification lattice; and using, in the classification phase, the set of voting nodes to vote for a classification value for the presentation p;

wherein the set of voting nodes is selected according to a selection function operating on at least $m_p$ and the FCA classification lattice;

wherein a classification value, c, is voted on according to a voting function operating on at least the output of the selection function, the FCA classification lattice, and $m_p$.

* * * * *